(12) United States Patent
Derman

(10) Patent No.: US 11,939,963 B1
(45) Date of Patent: Mar. 26, 2024

(54) FRICTIONLESS SPINNING ENERGY DEVICE

(71) Applicant: Jay S Derman, Carlsbad, CA (US)

(72) Inventor: Jay S Derman, Carlsbad, CA (US)

( * ) Notice: Subject to any disclaimer, the term of this patent is extended or adjusted under 35 U.S.C. 154(b) by 0 days.

(21) Appl. No.: 18/196,096

(22) Filed: May 11, 2023

Related U.S. Application Data

(63) Continuation-in-part of application No. 17/976,640, filed on Oct. 28, 2022, now Pat. No. 11,686,285, which is a continuation-in-part of application No. 17/838,040, filed on Jun. 10, 2022, now Pat. No. 11,519,551.

(60) Provisional application No. 63/426,797, filed on Nov. 21, 2022, provisional application No. 63/420,719, filed on Oct. 31, 2022, provisional application No. 63/215,062, filed on Jun. 25, 2021.

(51) Int. Cl.
| | |
|---|---|
| *F03D 80/70* | (2016.01) |
| *F03D 3/00* | (2006.01) |
| *F03D 9/00* | (2016.01) |
| *F03D 9/11* | (2016.01) |
| *F03D 9/25* | (2016.01) |
| *F16C 32/04* | (2006.01) |

(52) U.S. Cl.
CPC ........... *F03D 80/703* (2023.08); *F03D 3/005* (2013.01); *F03D 9/007* (2013.01); *F03D 9/11* (2016.05); *F03D 9/25* (2016.05); *F05B 2240/14* (2013.01); *F05B 2240/511* (2013.01); *F05B 2240/61* (2013.01); *F16C 32/0427* (2013.01)

(58) Field of Classification Search
CPC .......... F03D 80/703; F03D 9/11; F03D 3/005; F03D 9/007
USPC ........................................ 248/341; 416/204 R
See application file for complete search history.

(56) References Cited

U.S. PATENT DOCUMENTS

| | | | |
|---|---|---|---|
| 7,381,030 B1 * | 6/2008 | Vanderhye | F03D 3/005 416/169 R |
| 10,612,515 B2 * | 4/2020 | Reyna | F03D 3/02 |
| 11,519,551 B1 * | 12/2022 | Derman | F16M 11/08 |
| 11,549,485 B1 * | 1/2023 | Plemmons | F03D 3/005 |
| 11,686,285 B1 * | 6/2023 | Derman | F03D 3/009 416/204 R |
| 2009/0196763 A1 * | 8/2009 | Jones | F03D 3/005 416/197 A |
| 2016/0312768 A1 * | 10/2016 | Takakura | F03D 80/70 |
| 2021/0391778 A1 * | 12/2021 | Pederson | H02K 21/222 |

\* cited by examiner

*Primary Examiner* — Todd M Epps

(57) ABSTRACT

A spinning device comprising a blade assembly includes a hollow body, and a rod coupled to the hollow body and supported via a magnetic levitation assembly is configured to generate energy.

16 Claims, 5 Drawing Sheets

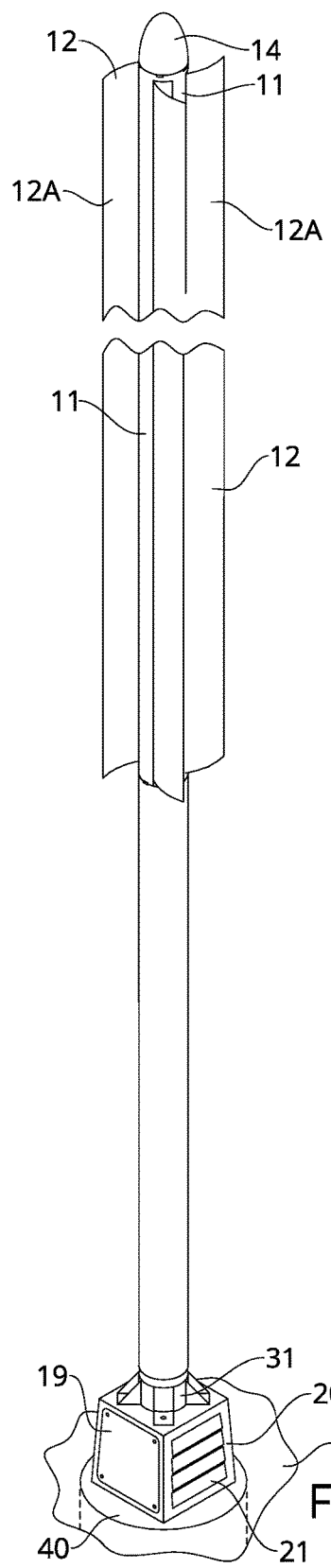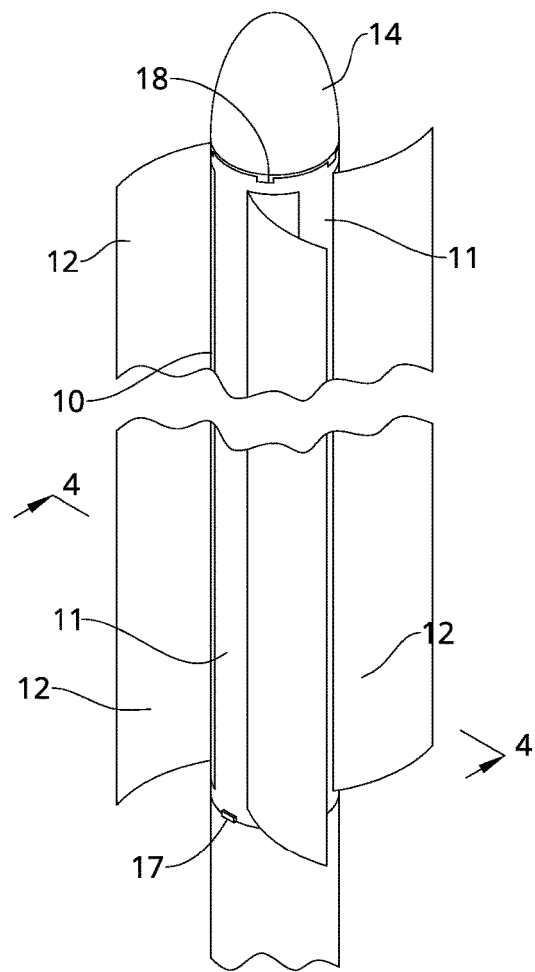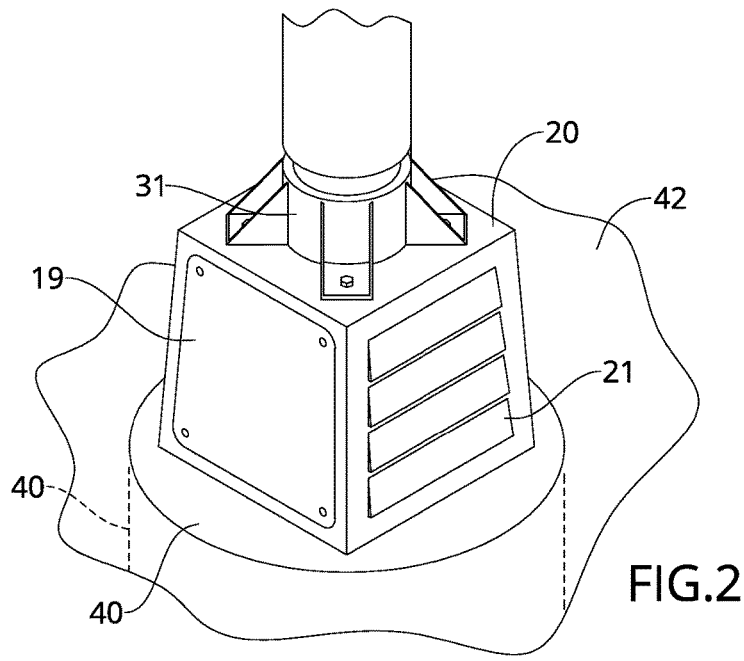
FIG.1
FIG.2

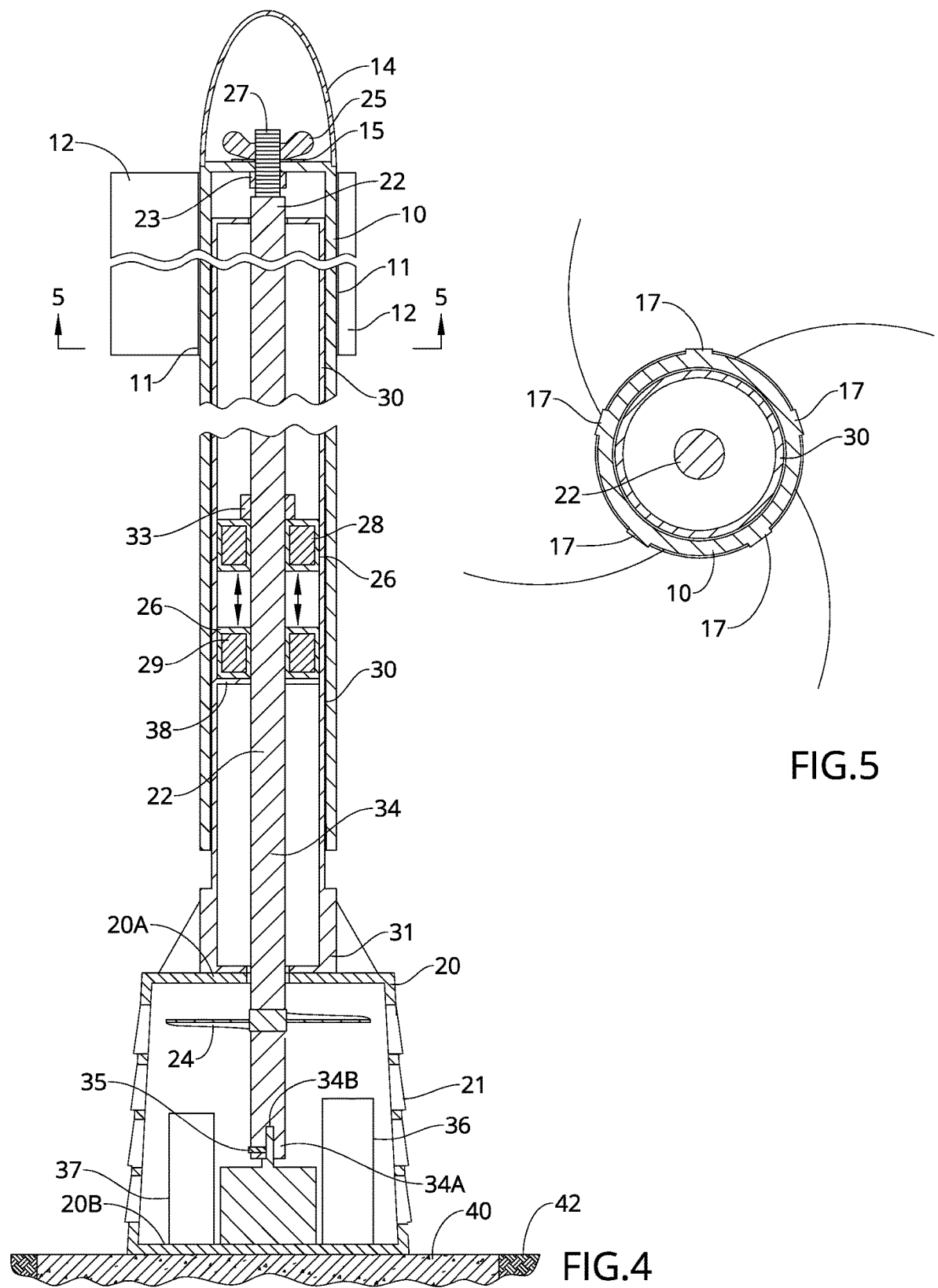

FRICTIONLESS SPINNING ENERGY DEVICE

RELATED APPLICATION

This application claims benefit to U.S. Provisional Application No. 63/420,719 filed Oct. 31, 2022, and to U.S. Provisional Application No. 63/426,797 filed Nov. 21, 2022. This application is also a continuation in part of application Ser. No. 17/976,640 filed Oct. 28, 2022, which claims benefit to U.S. Provisional Application No. 63/273,994 filed on Oct. 31, 2021 and is a Continuation-In-Part of U.S. Non-Provisional application Ser. No. 17/838,040 filed on Jun. 10, 2022 which claims benefit to U.S. Provisional Application No. 63/215,062 filed on Jun. 25, 2021, all of which are incorporated by reference herein in their entirety.

BACKGROUND

The present disclosure relates generally to spinning devices and systems.

Spinning devices may be used for a variety of different applications including, but not limited to toys, decorations, spinning hangers, turbines and the like. As such, an improved system for a spinning device is desirable.

SUMMARY

According to various embodiments, disclosed is an energy generator device, comprising: a vertical shaft configured to engage a shaft engagement member of a generator; a blade assembly coupled to the shaft, the blade assembly configured to rotate via wind forces, wherein a rotation of the blade assembly is configured to cause the shaft to rotate, and wherein a rotation of the shaft is configured to cause the shaft engagement member to rotate for generating energy in the generator; a magnetic levitation assembly configured to effectuate a lift force on the shaft, to reduce or eliminate an effective vertical weight of the shaft on the shaft engagement member. In some embodiments, the shaft engagement member includes at least one flat surface, configured to be received within a hollow of the shaft, the hollow of the shaft having a shape corresponding to a shape of the shaft engagement member. In some embodiments, the shaft engagement member comprises a hollow for receiving the shaft, wherein the shaft includes at least one flat surface, and wherein the hollow of the shaft engagement member has a shape which corresponds the shape of the shaft. In some embodiments, the magnetic levitation assembly includes an upper magnetic component which is coupled to the shaft, and a lower magnetic component which is fixed in position with respect to the energy generator device, wherein the upper magnetic component is configured to float above the lower magnetic component. In certain embodiments, the lower magnetic component and the upper magnetic component are configured to surround the shaft. In some embodiments, the lower magnetic component and the upper magnetic component comprise a plurality of magnets which surround the shaft. In some embodiments, the device further comprises a rotating tube which is coupled to an upper portion of the shaft, wherein the blade assembly is supported on the rotating tube. In certain embodiments, the device comprises a stationary internal tube nested within the rotating tube, wherein the lower magnetic component is supported by the stationary internal tube. In some embodiments, the stationary internal tube is supported on top of a housing which is configured to contain said generator. In some embodiments, the housing is further configured to contain a battery. In certain embodiments, the housing includes a door. In some embodiments, the housing includes ventilation openings. In further embodiments, the device comprises a fan mounted to a section of the shaft below a top wall of the housing, and configured to spin together with the shaft. In some embodiments, the blade assembly comprises a plurality of blades supported on a blade tube, the blade tube configured to couple to the rotating tube. In some embodiments, the device further comprises a top cap structure coupled to a top end of the rotating tube. In some embodiments, the top cap structure is a solar powered lighting.

BRIEF DESCRIPTION OF THE FIGURES

The detailed description of some embodiments of the invention will be made below with reference to the accompanying figures, wherein the figures disclose one or more embodiments of the present invention.

FIG. 1 is a perspective view of an energy generator device, in accordance with certain embodiments.

FIG. 2 is a zoomed in perspective view of the energy generator device.

FIG. 4 is a section view taken along line 4-4 in FIG. 1.

FIG. 5 is a section view taken along line 5-5 in FIG. 4.

DETAILED DESCRIPTION OF CERTAIN EMBODIMENTS

Figure 3:
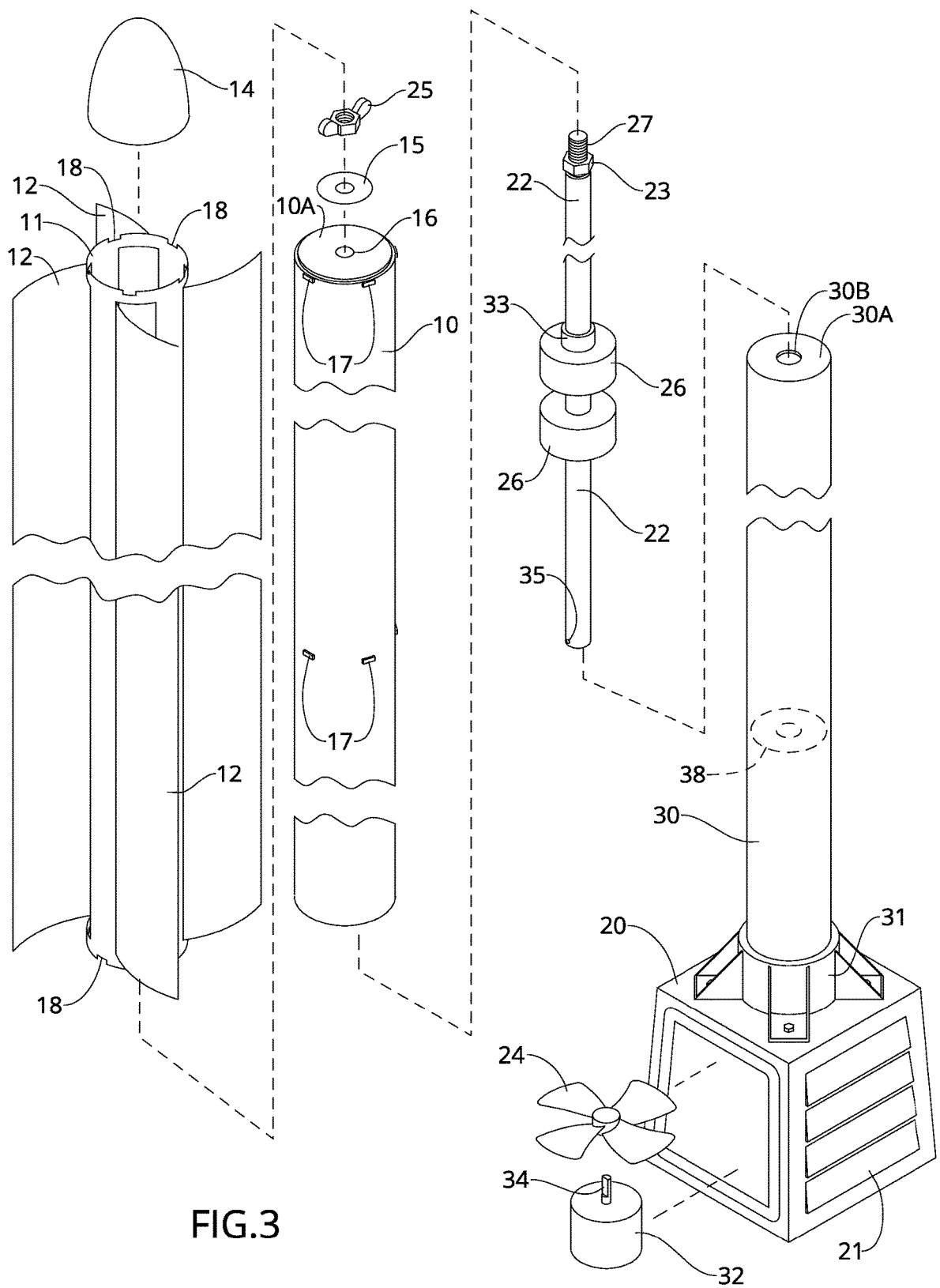
FIG. 3 is an exploded view of the energy generator device.
Figure 6:
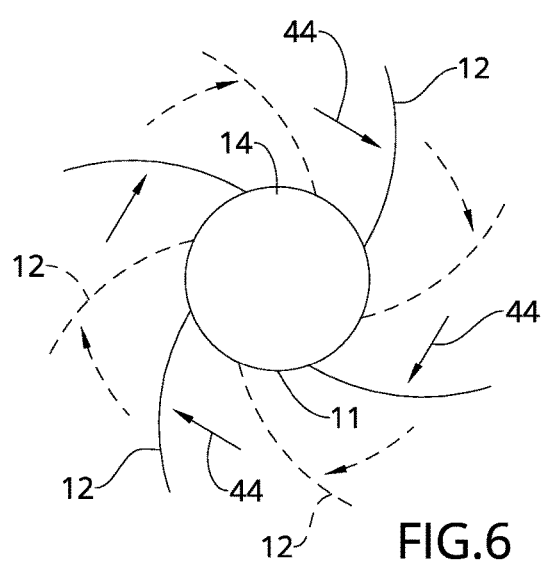
FIG. 6 is a top view, illustrating a spinning motion of a blade assembly under wind forces.
Figure 7:
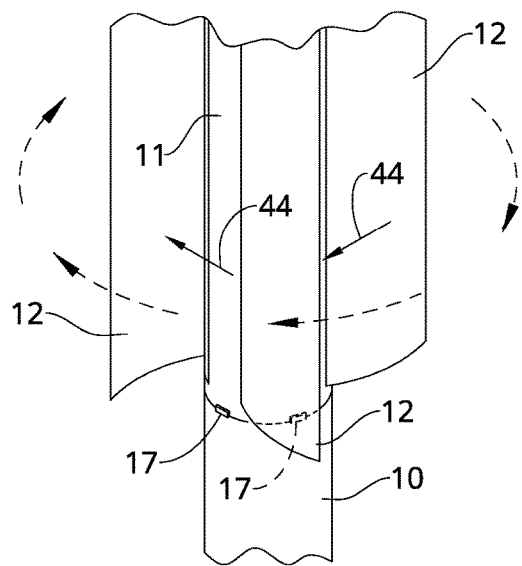
FIG. 7 is a detailed perspective view showing rotation of the blade assembly.
Figure 8:
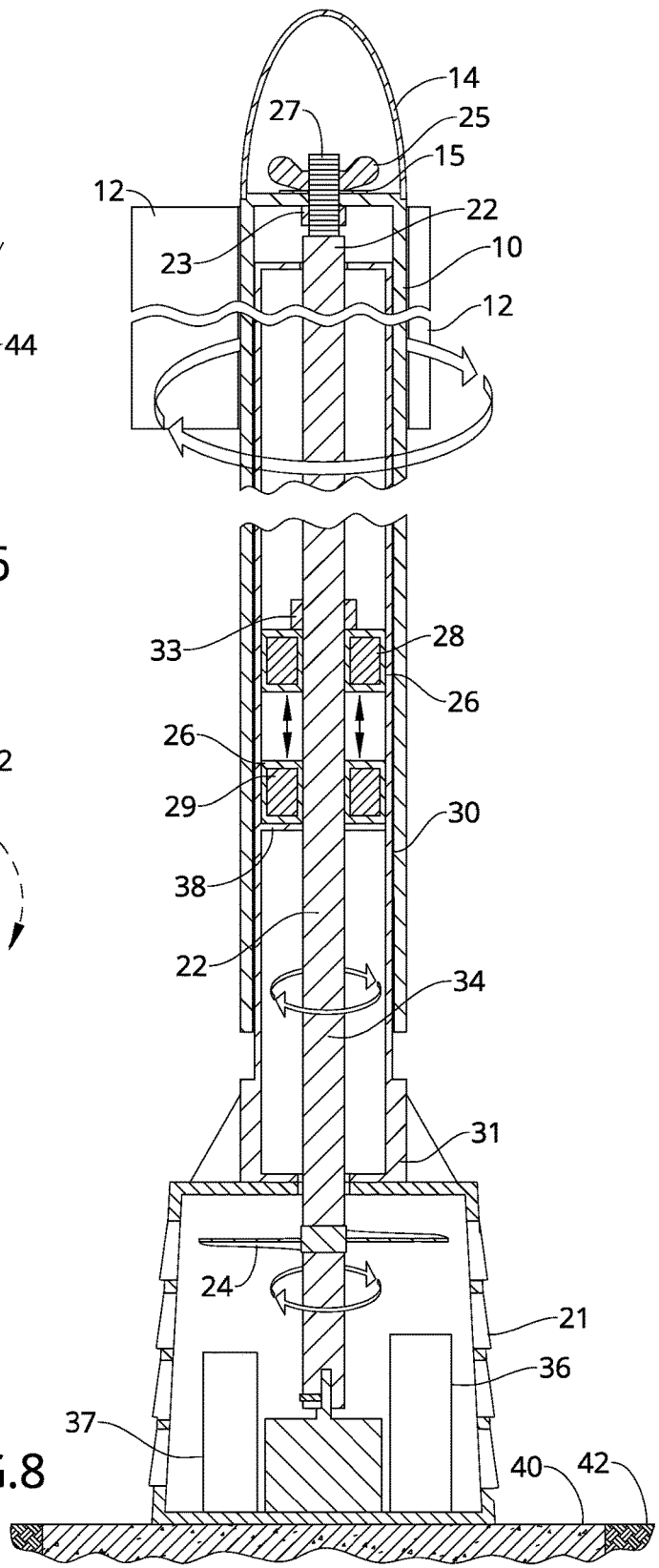
FIG. 8 is a section view similar to FIG. 3, showing the spinning motion of the internal device components.

According to various embodiments as depicted in FIGS. 1-11, disclosed is an energy generator device 100 generally comprising a blade assembly 12 supported on a shaft 22, said shaft 22 being coupled to a generator 32 that harnesses energy from the rotation of the shaft 22, wherein a rotation of blade assembly 12 via wind 44 or other forces causes shaft 22 to rotate. In certain embodiments, a magnetic levitation assembly 26 is configured to reduce or eliminate an effective weight of the shaft 22 on a shaft engagement member of the generator, which enables shaft 22 to rotate with reduced frictional forces. In some embodiments, magnetic assembly 26 includes an upper magnetic component 28 which is coupled to shaft 22, and a lower magnetic component 29 which is fixed in position with respect to device 100, wherein upper magnetic component 28 may float above lower magnetic component 29.

In some embodiments, blade assembly 12 is supported on a rotating tube 10 which is coupled to shaft 22. Lower magnetic component 29 may be supported via a stationary internal tube 30 which nests inside rotating tube 10. Stationary internal tube 30 may further be supported atop a housing 20 which contains generator 32, wherein housing 20 may support the device on a ground or other surface 42. In certain embodiments, poured footing 40 may be used for more stable support of device 100 where needed. In some further embodiments, housing 20 may also contain a battery 36, an inverter/alternator 37, and/or other components for storage, conversion, and/or use of the harnessed energy.

In embodiments, blade assembly 12, shaft 22, and rotating tube 10 are configured to rotate about a central axis which is generally vertical, i.e., perpendicular to surface 42. In certain embodiments, blade assembly 12 may comprise a plurality of blades 12A supported on a blade tube 11. In some embodiments, blade assembly 12 may comprise 2 or more blades 12A. In one embodiment, blade assembly 12 may comprise 4 blades 12A. In some embodiments, blades 12A may be Savonius type blades, but are not limited to this option. In certain embodiments, blades 12A may be vertically elongated having a length to radius ratio which is greater than 1, or greater than 5, or greater than 10. In some embodiments, blades 12A may be between approximately 10 feet to approximately 20 feet in length but are not limited to this option. It shall be appreciated that blades 12A may have different geometric configurations and sizes in alternate embodiments.

Figure 10:
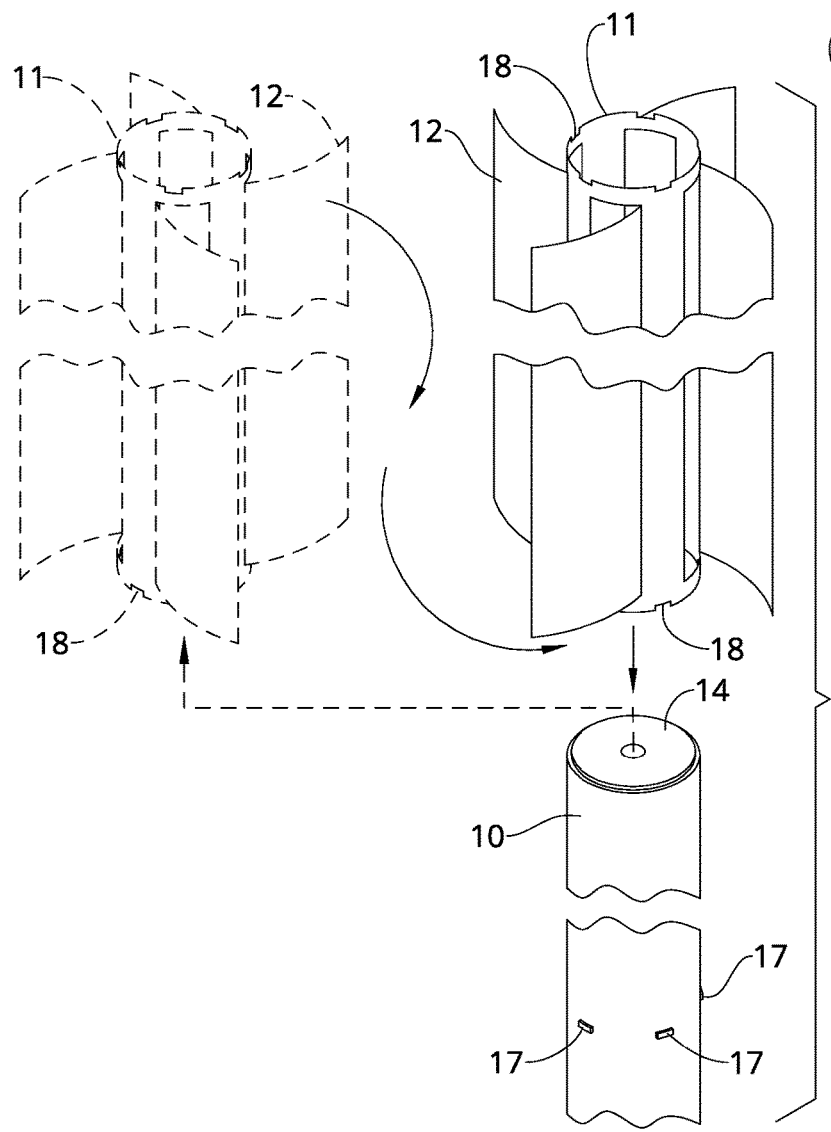
FIG. 10 is a detailed perspective view showing the blade assembly being flipped over in order to reverse the direction of spinning.

In some embodiments, blades 12A and blade tube 11 may be a unitary piece, but not necessarily so. In one embodiment, blade tube 11 may comprise notches 18 configured to engage tabs 17 on rotating tube 10 for attachment of blade tube 11 to rotating tube 10. In certain embodiments, blade tube 11 may be flipped upside down, to change or reverse the rotational orientation of blade assembly 12, as shown in FIG. 10. It shall be appreciated however that in alternate embodiments, blades 12A may be directly coupled to rotating tube 10.

In some embodiments, shaft 22 may be secured to rotating tube 10 at a top end portion 27 of the shaft. In one embodiment, rotating tube 10 may comprise a rotating tube top end cover 10A including a shaft hole 16 through which top end portion 27 of shaft 22 may be engaged. Stationary internal tube 30 may similarly comprise a stationary internal tube top end cover 30A including shaft hole 30B through which top end portion 27 of shaft 22 may pass. Top end portion 27 may be threaded for engagement with a shaft wing nut 25 or similar component above rotating tube top end cover 10A and a shaft nut 23 or similar component below rotating tube top end cover 10A, wherein the top end cover 10A may be compressed between wing nut 25 and shaft nut 23 for securing shaft 22 to rotating tube 10 at top end cover 10A. A rubber washer 15 may further be provided between shaft wing nut 25 and top end cover 10A. It shall be appreciated that different methods of securing shaft 22 to rotating tube 10 may be used in alternate embodiments.

In certain embodiments, a top cap structure 14 may be coupled to the top end perimeters of rotating tube 10/blade tube 11 over top end cover 10A. Top cap structure 14 may enhance the aesthetic appearance of device 100 and/or be a lighting source, which may be solar powered in some embodiments. In one embodiment, top cap structure 14 may comprise a hollow dome or egg shaped structure that caps spinning device 100. However different design configurations may be used in alternate embodiments.

Figure 9:
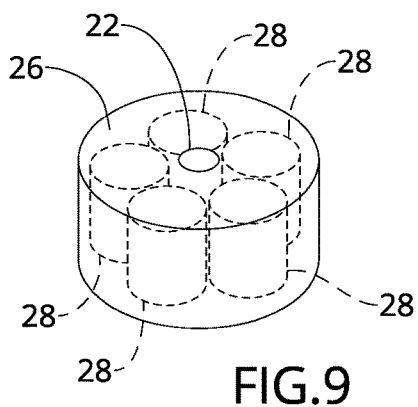
FIG. 9 is a detailed view of a magnetic assembly component of the device.
Figure 11:
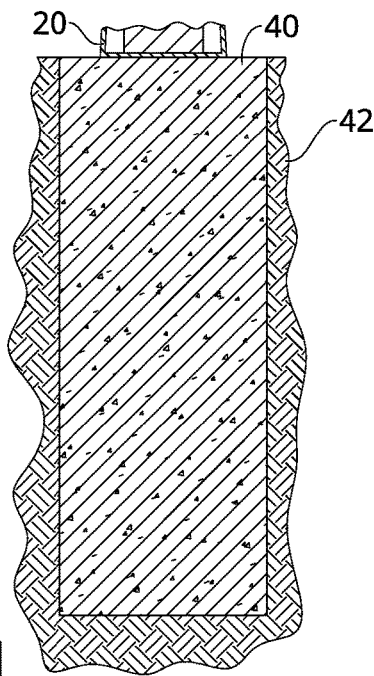
FIG. 11 illustrates in ground support of the device according to certain embodiments.

In certain embodiments, magnetic assembly 26 may comprise an upper magnetic ring component 28 and a lower magnetic ring component 29 which are oriented in opposing polarity and include a central opening for shaft 22. In certain embodiments, each of upper magnetic component 28 and lower magnetic component 29 may comprise neodymium magnets but are not limited to this option. In certain embodiments, each of upper magnetic component 28 and lower magnetic component 29 may comprise a plurality of magnets which may be arranged in a circular orientation as shown in FIG. 9. In one embodiment, each of upper magnetic ring component 28 and lower magnetic ring component 29 may comprise 5 cylindrical magnets, arranged around shaft 22 as shown. However, any number of magnetic, including single piece magnets may be used in alternate embodiments.

In some embodiments, lower magnetic ring component 29 may be attached to a magnetic disc support plate 38 provided within stationary internal tube 30. In certain embodiments, the central opening of lower magnetic ring component 29 allows shaft 22 to freely slide up and down with respect to lower magnetic ring component 29. In further embodiments, upper magnetic ring component 28 may be directly attached to shaft 22 and/or attached via a shaft collar 33 as shown. As such, a repulsive force between upper and lower magnetic ring components 28, 29 forces shaft 22 along with rotating tube 10 to move upwards with respect to stationary internal tube 30.

In some embodiments, battery housing 20 may form an enclosure for holding generator 32 and other components associated with spinning device 100 (e.g., battery 36, inverter/alternator 37, etc.). In one embodiment, battery housing 20 may comprise a top wall 20A, a bottom wall 20B, and surrounding side walls as shown. In one embodiment, the surrounding side walls of the battery housing 20 may comprise a housing door 19. In further embodiments, the surrounding side walls of the battery housing 20 may comprise housing vents 21 to allow for cooling.

In certain embodiments, stationary shaft 30 may be supported on top wall 20A. In certain embodiments, a stationary tube base 31 may be attached to top wall 20A for securing stationary tube base 31 to top wall 20A. However, other attachment mechanisms may be used in alternate embodiments. In some embodiments, top wall 20A and stationary tube base 31 may comprise aligned central openings through which shaft 22 may pass to engage with generator 32 within the battery housing.

In certain embodiments, generator 32 may comprise an engagement member 34 configured to transfer rotational energy of shaft 22 to generator 32, wherein magnetic levitation assembly 26 effectuate a vertically upwards or lifting force on shaft 22 with respect to shaft engagement member 34 to reduce or eliminate frictional forces due to vertical normal forces between the bottom end of the shaft and the top end of the shaft engagement member. In some embodiments, shaft engagement member 34 may comprise a shaft with at least one flat surface, configured to be received within a correspondingly configured hollow 34A of shaft 22. In alternate embodiments, shaft engagement member 34 may conversely provide a hollow for receiving shaft 22, wherein shaft 22 may include at least one flat surface at its bottom end portion. It shall be appreciated that shaft engagement member 34/hollow 34A may comprise any number of flat surfaces in alternate embodiments. In one example, shaft engagement member 34 may be a D-shaft with one flat surface as shown in FIG. 3. In further embodiments, a shaft set screw 35 may be used to secure shaft 22 to shaft engagement member 34. Magnetic levitation assembly 26 lifts shaft 22 to create a separation between potential horizontal contact surfaces 34B and/or reduce the effective weight of the shaft on engagement member 34 thereby reducing frictional forces as the shaft rotates. It shall be appreciated that different components may be used for engaging shaft 22 to generator 32 in alternate embodiments. In some further embodiments, shaft 22 may support a housing fan 24, which may be mounted to a section of shaft 22 below top wall 20A, i.e., within battery housing 20. Housing fan 24 may spin together with shaft 22 to provide cooling (along with housing vents 21) within battery housing 20.

It shall be appreciated that the disclosed device and system can have multiple configurations in different embodiments. It shall be appreciated that spinning device 100 may incorporate other components as known in the art for conversion, storage, and/or use of wind energy. It shall be appreciated that spinning device 100 may be configured for different uses in alternate embodiments.

It shall be appreciated that the components of device 100 may comprise any alternative known materials in the field and be of any size and/or dimensions. In certain embodiments, components device 100 may be made of plastic, metal, and the like. Such components may further be non-magnetic and/or configured to not interfere with the functionality of the levitation assembly. It shall be appreciated that the components of device 100 may be manufactured and assembled using any known techniques in the field. Furthermore, the components of device 100 may be provided as an assembled unit and/or as a kit for assembly by the end user, according to alternate embodiments.

As used herein, the articles "a" and "an" are intended to include one or more items, and may be used interchangeably with "one or more." Where only one item is intended, the term "one" or similar language is used. Also, as used herein, the terms "has", "have", "having", "with" or the like are intended to be open-ended terms. Further, the phrase "based on" is intended to mean "based, at least in part, on" unless explicitly stated otherwise.

The constituent elements of the disclosed device and system listed herein are intended to be exemplary only, and it is not intended that this list be used to limit the device of the present application to just these elements. Persons having ordinary skill in the art relevant to the present disclosure may understand there to be equivalent elements that may be substituted within the present disclosure without changing the essential function or operation of the device. Terms such as 'approximate,' 'approximately,' 'about,' etc., as used herein indicate a deviation of within +/−10%. Relationships between the various elements of the disclosed device as described herein are presented as illustrative examples only, and not intended to limit the scope or nature of the relationships between the various elements. Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An energy generator device, comprising:
    a vertical shaft configured to engage a shaft engagement member of a generator;
    a blade assembly coupled to the shaft, the blade assembly configured to rotate via wind forces, wherein a rotation of the blade assembly is configured to cause the shaft to rotate, and wherein a rotation of the shaft is configured to cause the shaft engagement member to rotate for generating energy in the generator;
    a magnetic levitation assembly configured to effectuate a lift force on the shaft, to reduce or eliminate an effective vertical weight of the shaft on the shaft engagement member.

2. The energy generator device of claim 1, wherein the shaft engagement member includes at least one flat surface, configured to be received within a hollow of the shaft, the hollow of the shaft having a shape corresponding to a shape of the shaft engagement member.

3. The energy generator device of claim 1, wherein the shaft engagement member comprises a hollow for receiving the shaft, wherein the shaft includes at least one flat surface, and wherein the hollow of the shaft engagement member has a shape which corresponds the shape of the shaft.

4. The energy generator device of claim 1, the magnetic levitation assembly including an upper magnetic component which is coupled to the shaft, and a lower magnetic component which is fixed in position with respect to the energy generator device, wherein the upper magnetic component is configured to float above the lower magnetic component.

5. The energy generator device of claim 4, wherein the lower magnetic component and the upper magnetic component are configured to surround the shaft.

6. The energy generator device of claim 5, wherein the lower magnetic component and the upper magnetic component comprise a plurality of magnets which surround the shaft.

7. The energy generator device of claim 4, further comprising a rotating tube which is coupled to an upper portion of the shaft, wherein the blade assembly is supported on the rotating tube.

8. The energy generator device of claim 7, further comprising a stationary internal tube nested within the rotating tube, wherein the lower magnetic component is supported by the stationary internal tube.

9. The energy generator device of claim 8, wherein the stationary internal tube is supported on top of a housing which is configured to contain said generator.

10. The energy generator device of claim 9, wherein the housing is further configured to contain a battery.

11. The energy generator device of claim 9, wherein the housing includes a door.

12. The energy generator device of claim 9, wherein the housing includes ventilation openings.

13. The energy generator device of claim 9, further comprising a fan mounted to a section of the shaft below a top wall of the housing, and configured to spin together with the shaft.

14. The energy generator device of claim 7, wherein the blade assembly comprises a plurality of blades supported on a blade tube, the blade tube configured to couple to the rotating tube.

15. The energy generator device of claim 7, further comprising a top cap structure coupled to a top end of the rotating tube.

16. The energy generator device of claim 15, wherein the top cap structure is a solar powered lighting.

* * * * *